United States Patent [19]
Kent

[11] Patent Number: 5,375,812
[45] Date of Patent: Dec. 27, 1994

[54] DYNAMIC METAL-TO-METAL SEAL

[75] Inventor: Peter M. Kent, Greengates Warthill, Scotland

[73] Assignee: ABB Vetco Gray Inc., Houston, Tex.

[21] Appl. No.: 163,242

[22] Filed: Dec. 6, 1993

[51] Int. Cl.$^5$ .................... F16K 41/08; F16J 15/28; F16J 15/32
[52] U.S. Cl. .................... 251/214; 277/112; 277/124; 277/125; 277/205; 277/207 R; 277/211; 277/236
[58] Field of Search ................ 251/214; 277/110, 112, 277/124, 125, 152, 205, 207 R, 236, 211

[56] References Cited

U.S. PATENT DOCUMENTS

| | | | |
|---|---|---|---|
| 3,176,723 | 4/1965 | Hodgeman et al. | 277/36 |
| 3,279,806 | 10/1966 | Bialkowski | 277/36 |
| 3,373,998 | 3/1968 | Bialkowski | 277/26 |
| 3,527,507 | 9/1970 | Clark et al. | 277/205 |
| 4,298,206 | 11/1981 | Kojima | 277/205 |
| 4,325,558 | 4/1982 | Poggio | 251/214 |
| 4,486,002 | 12/1984 | Riess et al. | 251/214 |
| 4,553,759 | 11/1985 | Kilmoyer | 277/12 |
| 4,695,061 | 9/1987 | Meisner et al. | 251/214 |
| 4,791,987 | 12/1988 | Cassity et al. | 277/36 |
| 4,903,971 | 2/1990 | Bauer | 266/152 |
| 5,031,923 | 7/1991 | Davies | 277/124 |
| 5,110,144 | 5/1992 | Burton et al. | 277/236 |
| 5,178,180 | 1/1993 | Parris et al. | 137/242 |
| 5,193,616 | 3/1993 | Hynes | 277/236 |
| 5,205,317 | 4/1993 | Neuerberg et al. | 137/242 |

Primary Examiner—George L. Walton
Attorney, Agent, or Firm—James E. Bradley

[57] ABSTRACT

A metal stem seal for sealing between a movable stem and a stem opening in a valve body has an annular seal body through which the stem extends. The seal has a flexible annular seal leg depending from the seal body for sealing against the stem. The inner surface of the seal leg has at least one groove defining a plurality of sealing lands, including at least a lower sealing land and upper sealing land. The undeflected inner diameter of the lower sealing land is selected so that upon insertion of the stem through the seal, the seal leg deflects outward. The undeflected diameter of the upper sealing land is selected so that it is larger than the undeflected inner diameter of the lower sealing land. The undeflected diameters of additional sealing lands are selected so that they are successively larger than the undeflected inner diameters of the sealing lands below them. Increased fluid pressure in the stem opening causes the seal leg to flex inward causing additional sealing lands to contact the stem.

11 Claims, 5 Drawing Sheets

NORMAL FORCES (in lbf/rad)

PRESSURE DIFFERENTIAL

| NODE | 0 psi | 1000 psi | 2000 psi | 3000 psi | 4000 psi | 5000 psi | 6000 psi | 7000 psi | 8000 psi | 9000 psi | 10000 psi |
|---|---|---|---|---|---|---|---|---|---|---|---|
| 106e$_2$ | 0 | 0 | 0 | 0 | 0 | 0 | 0 | 0 | 0 | 0 | 0 |
| 106e$_1$ | 0 | 0 | 0 | 0 | 0 | 0 | 0 | 0 | 0 | 0 | 0 |
| 106d$_2$ | 0 | 0 | 0 | 0 | 0 | 0 | 0 | 0 | 0 | 248 | 494 |
| 106d$_1$ | 0 | 63 | 248 | 389 | 518 | 646 | 779 | 919 | 1063 | 1089 | 1121 |
| 106c$_2$ | 0 | 0 | 0 | 116 | 244 | 367 | 468 | 551 | 623 | 626 | 631 |
| 106c$_1$ | 0 | 105 | 184 | 210 | 237 | 268 | 312 | 364 | 426 | 422 | 416 |
| 106b$_2$ | 269 | 353 | 359 | 347 | 334 | 322 | 312 | 301 | 291 | 295 | 296 |
| 106b$_1$ | 379 | 391 | 394 | 393 | 392 | 390 | 387 | 383 | 377 | 395 | 410 |
| 106a$_2$ | 122 | 113 | 130 | 151 | 171 | 191 | 209 | 225 | 240 | 268 | 295 |
| 106a$_1$ | 78 | 99 | 126 | 153 | 181 | 208 | 236 | 263 | 290 | 317 | 344 |

FIG. 6

DYNAMIC METAL-TO-METAL SEAL

BACKGROUND OF THE INVENTION

1. Field of the Invention

This invention relates in general to gate valves, and in particular to an improved metal-to-metal seal for sealing between a movable stem and a stem opening in a valve body.

2. Description of the Prior Art

A typical gate valve has a body with a flow passage extending through it. The flow passage intersects a central cavity wherein is located a gate that is perpendicular to the flow passage. In communication with the central cavity is a stem opening. A stem extends through the stem opening and into the central passage where the stem is connected to the gate. Selective movement of the stem causes the gate to move between closed and open positions that obstruct flow or allow flow, respectively, through the flow passage.

There are generally two types of gate valves: the rising-stem type, and the non-rising-stem type in the rising-stem type, the stem moves only axially without rotation, to move the gate between closed and open positions. In the non-rising-stem type, the stem only rotates, without moving axially, and the rotation of the stem, in conjunction with a gear connection between the stem and the gate, causes the gate to move between open and closed position.

Since the central cavity of the gate valve and the stem opening are in communication, the space between the stem and the stem opening must be sealed to avoid leakage. At first, elastomeric seals were used. However, since elastomeric seals do not have the necessary longevity, especially in corrosive environments, metal seals have become popular for several applications.

Several metal-to-metal seals have been developed for sealing between a movable stem and a stem opening in a valve body. However, generally such seals made prior to this invention have disadvantages such as premature wear, damage to the sealing surface, insufficient sealing capacity under certain conditions, and excessively short service life.

SUMMARY OF THE INVENTION

It is the general object of the invention to provide an improved metal-to-metal seal for sealing between a movable stem and a stem opening in a valve body. The improved metal seal has an annular seal body through which the stem extends. The seal has a flexible annular seal leg depending from the seal body for sealing against the stem. The inner surface of the seal leg has at least one groove defining a plurality of sealing lands, including at least a lower sealing land and upper sealing land. The undeflected inner diameter of the lower sealing land is selected so that upon insertion of the stem through the seal, the seal leg deflects outward. The undeflected diameter of the upper sealing land is selected so that it is larger than the undeflected inner diameter of the lower sealing land. The undeflected diameters of additional sealing lands are selected so that they are successively larger than the undeflected inner diameters of the sealing lands below them.

Increased fluid pressure in the stem opening causes the seal leg to flex inward, causing additional sealing lands to contact the stem, thus increasing the effective sealing surface while maintaining the contact forces between the stem and seal at beneficial levels. The above improvements result in a metal-to-metal seal with improved sealing capabilities and longer service life.

BRIEF DESCRIPTION OF THE DRAWINGS

FIG. 6 is a table of the normal forces at various contact points between the seal leg and the stem at various pressure differentials.

DETAILED DESCRIPTION OF THE INVENTION

Figure 1:
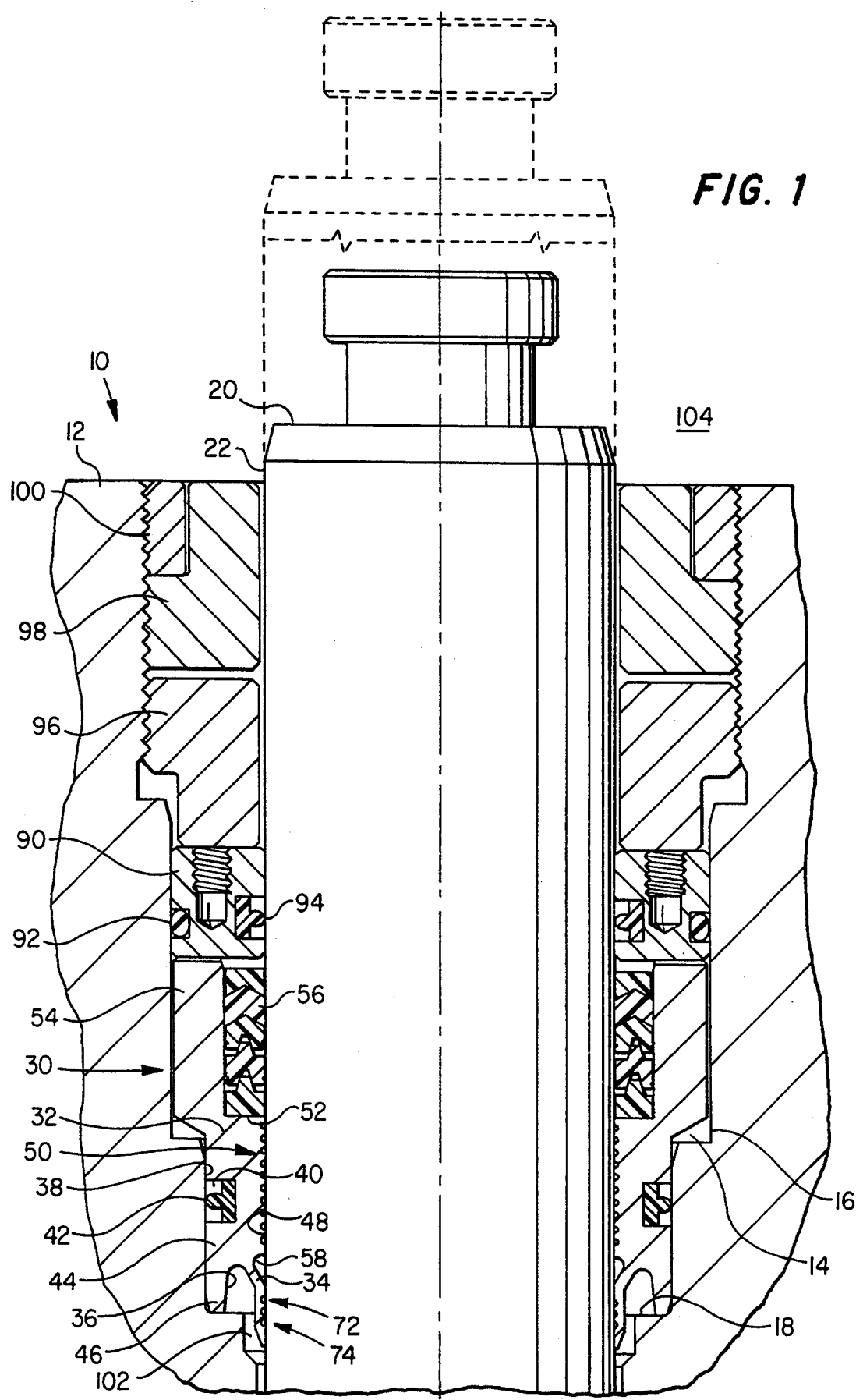
FIG. 1 is a vertical sectional view illustrating a portion of a typical gate valve, including the improved metal seal of the present invention.

FIG. 1, shows a portion of a gate valve 10 of the rising-stem type. Gate valve 10 has a valve body 12 having a stem opening 14. The stem opening 14 has a stepped inner diameter 16 defining an upwardly facing shoulder 18. A stem 20, having an outer diameter 22, is located through stem opening 14. Stem 20 is connected to a gate (not shown). Stem 20 moves axially within stem opening 14 and moves the gate between open and closed positions. Stem 20 does not rotate.

A metal seal 30 is located inside stem opening 14. Metal seal 30 has an annular seal body 32, a flexible annular seal leg 34, and an annular support leg 36 that is concentric with and surrounds seal leg 34. Seal body 32 has a stepped outer diameter 38 that mates with stepped inner diameter 16 of stem opening 14. Stepped outer diameter 38 of seal body 32 has a circumferential outer recess 40 for housing an elastomeric seal 42 in sealing engagement with stem opening 14. Support leg 36 depends from lower portion 44 of seal body 32. Support leg 36 has a lower end 46 that abuts upwardly facing shoulder 18 in stem opening 14.

Figure 2:
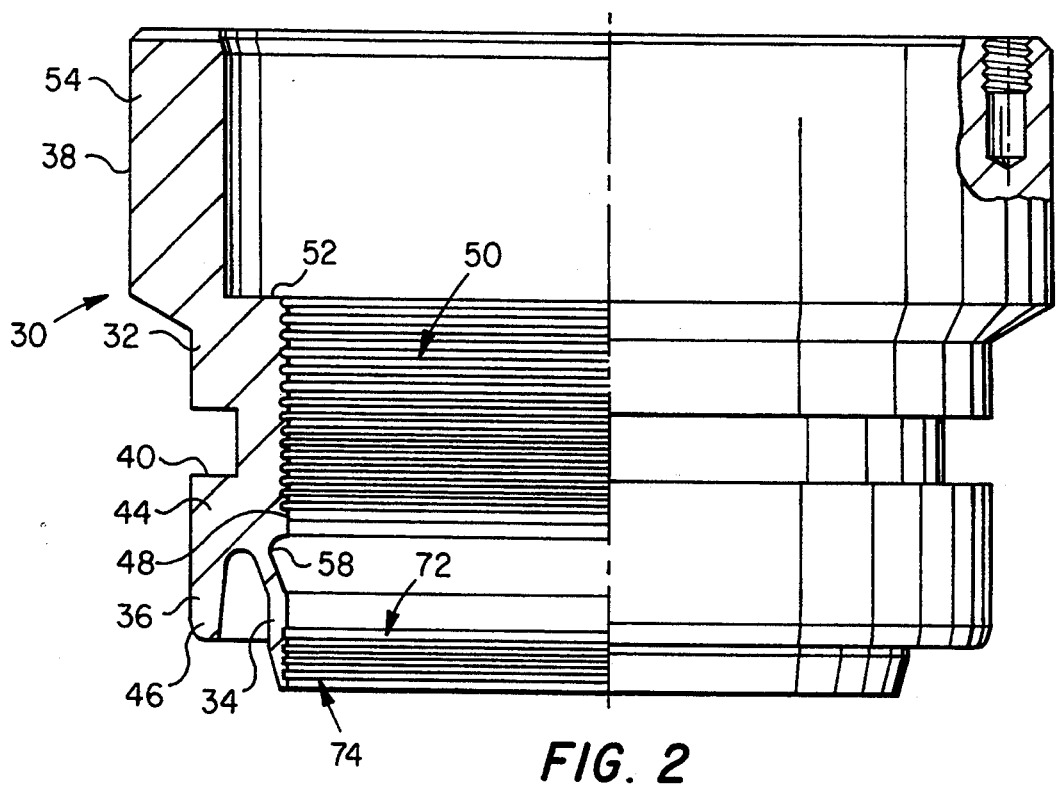
FIG. 2 is a view, partly in section, of the improved metal seal of the present invention shown in FIG. 1.
Figure 3:
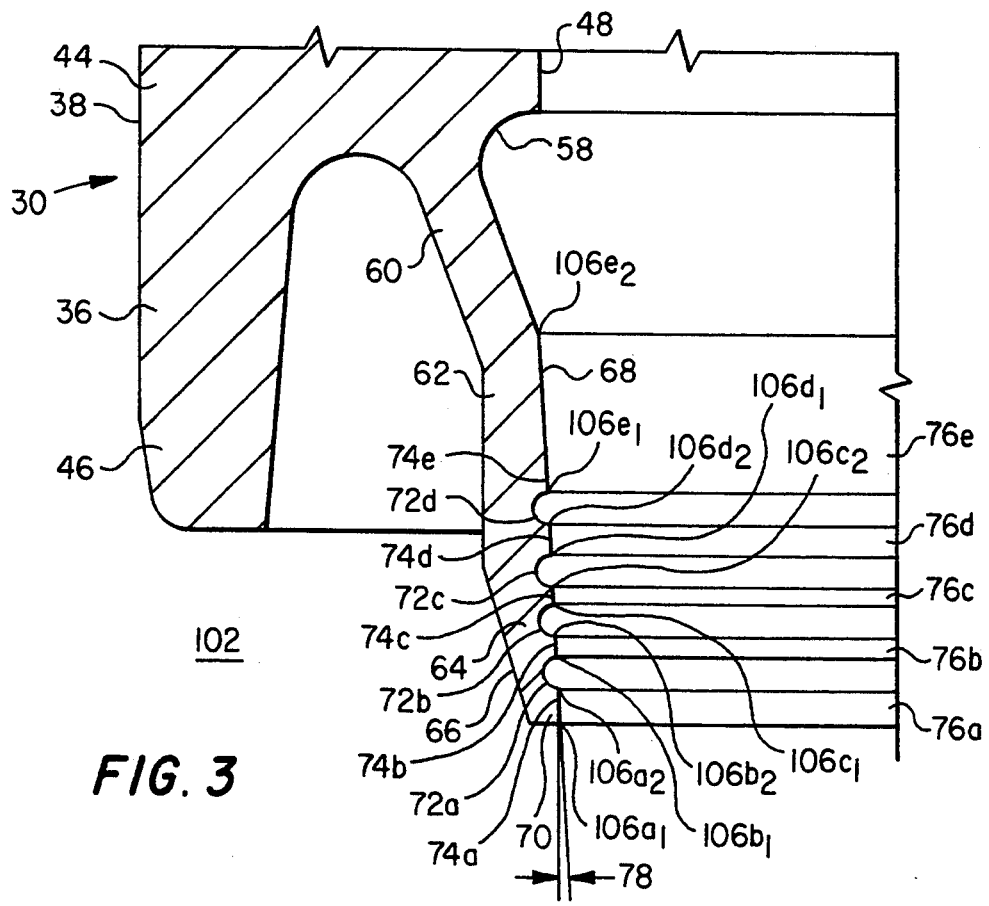
FIG. 3 is an enlarged sectional view of the seal leg of the metal seal of FIG. 2 shown in its undeflected position.

Referring now mainly to FIGS. 2 and 3, seal body 32 has a generally cylindrical inner diameter 48 which is slightly larger than outer diameter 22 of stem 20. Inner diameter 48 of seal body 32 has a plurality of circumferential lubricating grooves 50 that are axially spaced apart one from the other. Seal body 32 also has a circumferential inner recess 52 at upper portion 54 of seal body 32 for housing a chevron seal 56. Chevron seal 56 acts as a back-up seal between seal body 32 and stem 20.

Seal body 32 has a flexible annular seal leg 34 depending from lower portion 44 of seal body 32 for sealing against stem 20. A flex recess 58 is located at the lower end of inner diameter 48 of seal body 32, at the junction between lower portion 44 of seal body 32 and seal leg 34. Flex recess 58 facilitates the flexing of seal leg 34.

Seal leg 34 has an upper section 60, a middle section 62, and a lower section 64. Upper section 60 extends downwardly and inwardly from seal body 32. Middle section 62 extends downwardly and inwardly from the lower end of upper section 60, but in a more downward direction than upper section 60. Upper section 60 and middle section 62 both have generally uniform cross sections. Lower section 64 extends in the same direction as middle section 62, but has a tapered cross-section. Outer surface 66 of lower section 64 tapers towards inner surface 68 of middle and lower sections 62 and 64 as it approaches tip 70 of seal leg 34.

Inner surface 68 of middle and lower sections 62 and 64 has a plurality of axially spaced apart grooves 72a–d. Grooves 72 result in a plurality of axially spaced apart sealing lands 74a–e. Sealing lands 74 include lower sealing land 74a, intermediate sealing land 74b, upper sealing land 74c, and additional sealing lands 74d–e. Lower sealing land 74a is located at tip 70 of seal leg 34, intermediate sealing land 74b is located above lower sealing land 74a, upper sealing land 74c is located above intermediate sealing land 74b, and additional sealing lands 74d–e are located above upper sealing land 74c.

Each sealing land 74a–e has a corresponding sealing land surface 76a–e. Since angle 7e of inner surface 68 of middle and lower sections 62 and 64 is very small, sealing land surfaces 76a–e are very close to being cylindrical surfaces. As will be discussed later, during operation, seal leg 34 flexes inward, and sealing land surfaces 76a–e come into contact with stem 20, at which point sealing land surfaces 76a–e are cylindrical surfaces.

Since seal leg 34 is angled downwardly and inwardly, sealing lands 74e–a have successively smaller undeflected diameters. Therefore, sealing land 74e has an undeflected diameter that is larger than the undeflected diameter of sealing land 74d, which is in turn larger than the undeflected diameter of sealing land 74c, which is in turn larger than the undeflected diameter of sealing land 74b, which is in turn larger than the undeflected diameter of sealing land 74a.

The undeflected diameters of sealing lands 74a–b are selected so that they are slightly smaller than outer diameter 22 of stem 20. On the other hand, the undeflected diameters of sealing lands 74c–e are selected so that they are slightly larger than outer diameter 22 of stem 20. Selecting such sealing land diameters results in seal leg 34 being deflected outwardly upon insertion of stem 20 through seal 30. More specifically, upon insertion of stem 20 through seal 30, sealing land surfaces 76a–b will be in contact with stem 20, while sealing land surface 76c–e will not be in contact with stem 20.

Referring now mainly to FIG. 1, seal 30 is located inside stem opening 14, and lower end 46 of support leg 36 abuts upwardly facing shoulder 18 in the stem opening 14. Above seal 30 is located retaining ring 90. A downwardly facing surface of retaining ring 90 abuts upper portion 54 of seal body 32. Retaining ring 90 has a recess in its outer diameter that houses elastomeric seal 92, and a recess in its inner diameter that houses elastomeric seal 94. Elastomeric seal 92 is in sealing engagement with stem opening 14, and elastomeric seal 94 is in sealing engagement with stem 20. Lower retaining nut 96 is located above retaining ring 90. Lower retaining nut 96 is threadedly attached to stem opening 14 so that a lower surface of lower retaining nut 96 abuts an upper surface of retaining ring 90. Intermediate retaining nut 98 is located above lower retaining nut 96 and is threadedly attached to stem opening 14 so that a lower surface of intermediate retaining nut 98 abuts an upper surface of lower retaining nut 96. Finally, upper retaining nut 100 is located above intermediate retaining nut 98 and is threadedly attached to stem opening 14 so that a lower surface of upper retaining nut 100 abuts an upper surface of intermediate retaining nut 98. The retaining ring 90 and lower, intermediate, and upper retaining nuts 96, 98, and 100 function as a retaining means to maintain seal 30 in abutment with upwardly facing shoulder 18 of stem opening 14.

In operation, the above described structure functions as follows. Stem 20, located within stem opening 14 of valve 10, moves axially and in turn moves a gate (not shown) between closed and open positions to selectively control flow through valve 10. During operation, the region of stem opening 14 below seal 30 is at elevated pressures, this region is referred to as high pressure region 102 in the figures. The pressures in high pressure region 102 can vary from very low pressures to very high pressures in excess of 10,000 psi. Low pressure region 104, on the other hand, is at a lower pressure than high pressure region 102. Fluids therefore have a tendency to escape from high pressure region 102 to low pressure region 104.

As described above, metal seal 30 is located inside stem opening 14 and is kept in abutment with upwardly facing shoulder 18 by a retaining means comprising retaining ring 90, lower retaining nut 96, intermediate retaining nut 98, and upper retaining nut 100. Also, stem 20 is located through stem opening 14 and through seal 30. Since stem 20 is located through seal 30, seal leg 34 is deflected outwardly.

Figure 4:
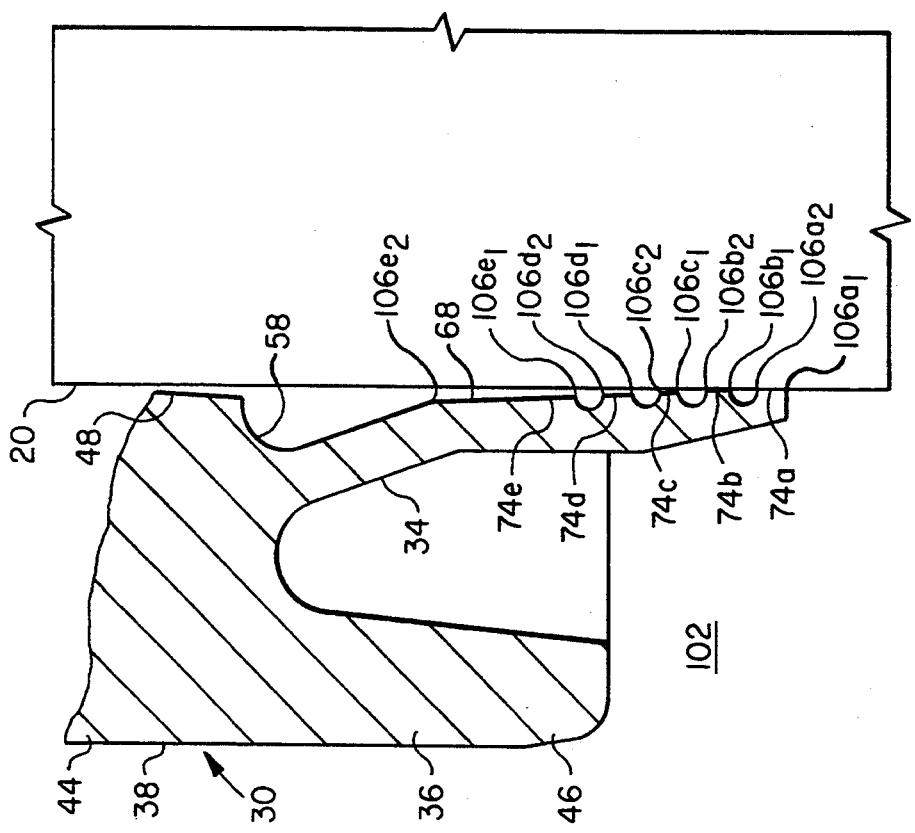
FIG. 4 is a sectional view of the seal leg of FIG. 3 being deflected outward by the stem of the valve.

Referring now to FIG. 4, when the pressure differential between high pressure region 102 and low pressure region 104 is zero, lower sealing land 74a and intermediate sealing land 74b are in contact with stem 20, and sealing lands 74c–e are not in contact with stem 20. Since lower and intermediate sealing lands 74a and 74b are being maintained in a deflected position by contact with stem 20, there exist normal forces at the points of contact.

FIG. 6 shows a table of the normal forces at various contact points, or nodes $106a_1$–$e_2$, for various pressure differentials. The table of FIG. 6 was developed by finite element analysis. For each of eleven representative pressures, FIG. 6 gives the normal forces, in pounds/radian, for each node $106a_1$–$e_2$. Although the units for the normal forces given in FIG. 6 are pounds-force/radian, since they were derived by analyzing points rather than areas, the values given are not representative of the actual forces but are only indicative of the relative size of the forces.

Referring now to both FIGS. 4 and 6, one can see that nodes $106a_1$ and $106a_2$ on lower sealing land 74a, and nodes $106b_1$ and $106b_2$ on intermediate sealing land 74b, are in contact with stem 20 since positive values for the normal forces at those nodes are shown in FIG. 6 for a zero psi pressure differential. On the other hand nodes $106c_1$–$e_2$ on sealing lands 74c–e are not in contact with stem 20 since normal forces of zero appear in FIG. 6 for nodes $106c_1$–$e_2$ for a zero psi pressure differential.

Figure 5:
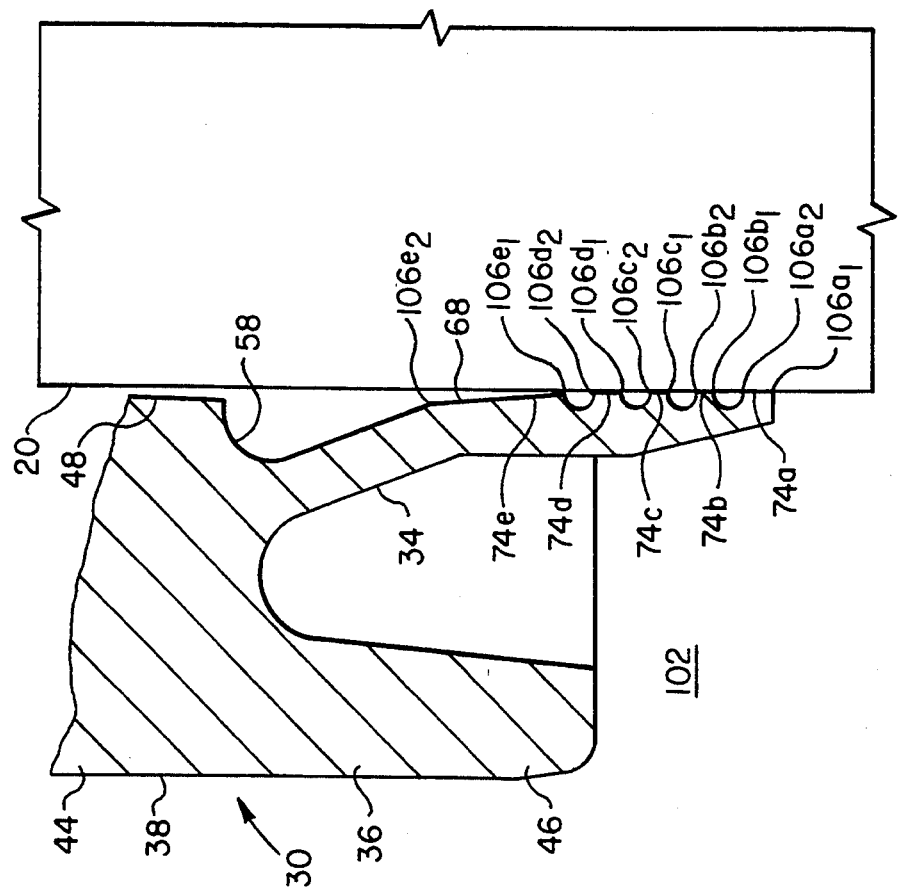
FIG. 5 is a sectional view of the seal leg of FIG. 4 being deflected inward by pressure in the stem opening.

As the pressure differential between high pressure region 102 and low pressure region 104 increases, seal leg 34 deflects inward, thus flexing inner surface 68 of middle and lower sections 62 and 64 of seal leg 34 towards stem 20. As the pressure differential increases, seal leg 34 continues to flex inward, and, eventually, additional sealing lands 74 come into contact with stem 20. For example, looking at upper sealing land 74c, when the pressure differential is about 1000 psi, node $106c_1$, on the lower portion of upper sealing land 74c, comes into contact with stem 20, while node $106c_2$, which is on the upper portion of upper sealing land 74c is not yet in contact with stem 20. As the pressure differential increases towards 3000 psi, more of upper sealing land 74c contacts stem 20 until the entire upper sealing land 74c is in contact with stem 20, as is the case when the pressure differential reaches 3000 psi. As the pressure differential continues to increase, additional sealing lands gradually come into contact with stem 20. The values in FIG. 6 show that once the pressure differential reaches 9000 psi, all of sealing lands 74a–d are in contact with stem 20, and only sealing land 74e is not in contact with stem 20. FIG. 5 shows seal leg 34 and stem 20 with sealing lands 74a–d in contact with stem 20.

The increase in the number of sealing lands 74 contacting stem 20 with increasing pressure differential results in a corresponding increase in sealing surface. The increased sealing surface that results with increasing pressure helps to maintain a positive seal as the pressure differential increases.

Figure 7:
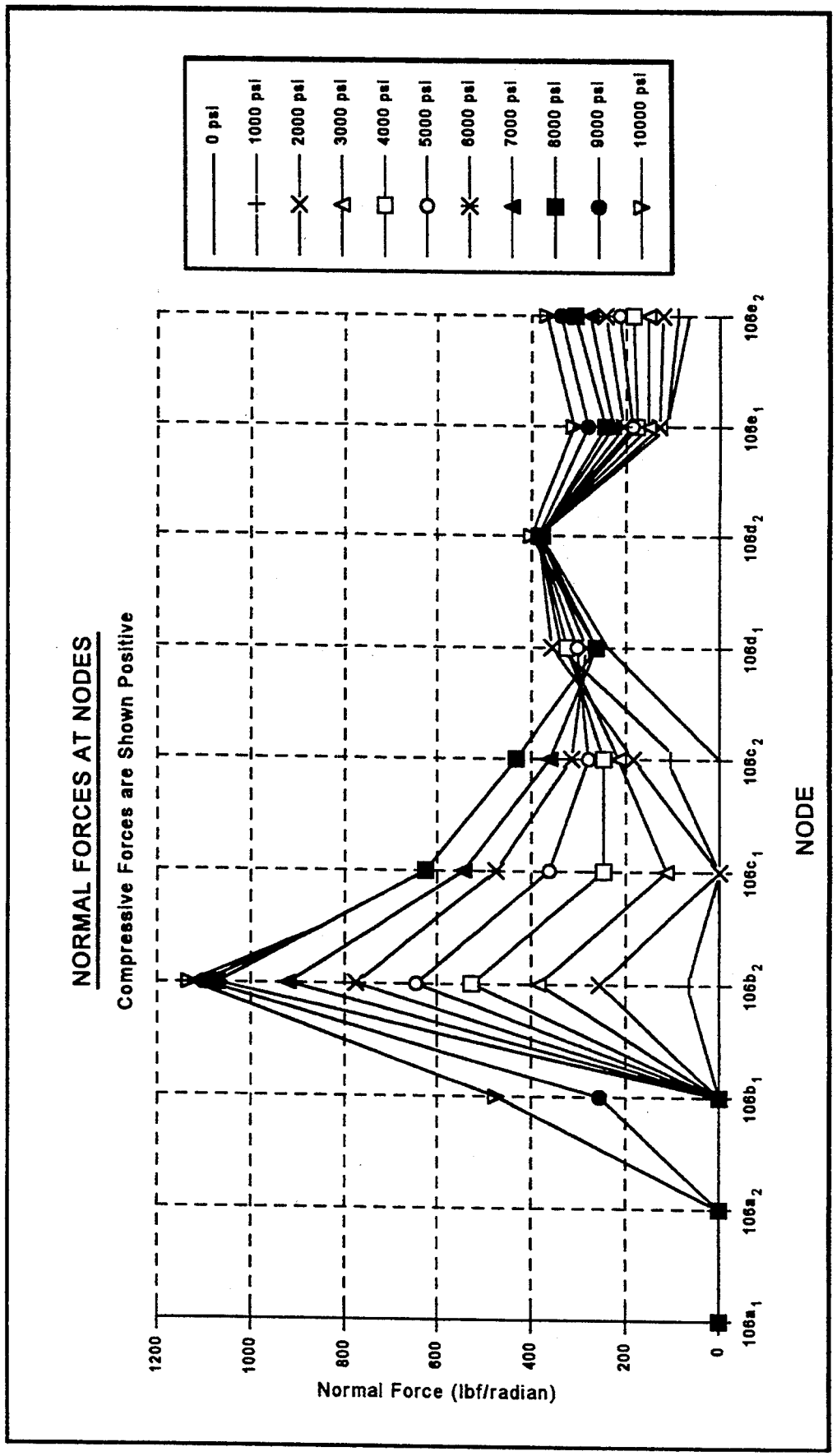
FIG. 7 is a graph of the information of FIG. 6, with the normal forces on the vertical axis, the nodes on the horizontal axis, and with each line representing a different pressure differential.

The present invention also results in more beneficial normal force levels between the seal leg 34 and stem 20. To obtain a positive seal, relatively high normal forces are required along the sealing surfaces. On the other hand, excessive normal forces at the contact points are undesirable because they result in damage to the sealing surfaces and eventual deterioration of seal integrity. The design of the present invention results in sufficiently large normal forces to provide a positive seal, while at the same time maintaining the forces at a low enough level to prevent damages to the sealing surfaces. Since seal leg 34 is flexible, the sealing surface increases with increasing pressure. The gradual increase in sealing surface prevents the normal forces at any one location along seal leg 34 to become excessively large. Furthermore, the shape of seal leg 34 ensures that each sealing land 74 maintains a sufficiently high normal force against stem 20 at any of the various pressure differentials that might be encountered during operation of valve 10. Referring again to FIG. 6, and looking generally at the normal force values for each node as the pressure differential increases, FIG. 6 shows that the normal forces at each node generally increase, or at least do not decrease drastically, as the pressure differential increases. FIG. 7 shows the information of FIG. 6 in graphical form, with the normal forces on the vertical axis, the nodes on the horizontal axis, and with each line representing a different pressure differential.

While the invention has been particularly shown and described with reference to a preferred embodiment, it will be understood by those skilled in the art that various changes in form and detail may be made therein without departing from the spirit and scope of the invention.

What is claimed is:

1. A metal seal for a gate valve having a valve body, an axially movable stem extending through a stem opening in the valve body for moving a gate between open and closed positions, the metal seal comprising:
   an annular seal body through which the stem extends;
   a flexible annular seal leg depending from the seal body for sealing against the stem, the seal leg having a tip at its lower end;
   an inner surface of the seal leg having a plurality of axially spaced apart grooves defining a lower sealing land at the tip, and at least one intermediate sealing land and an upper sealing land spaced above the lower sealing land;
   the lower sealing land having an undeflected inner diameter that is slightly less than the outer diameter of the stem so that the seal leg will flex outward as the stem inserts through the seal and seal against the stem;
   the intermediate sealing land having an undeflected inner diameter that is greater than the undeflected inner diameter of the lower sealing land;
   the upper sealing land having an undeflected inner diameter that is greater than the undeflected inner diameter of the intermediate sealing land; and
   the undeflected inner diameters of the intermediate and upper sealing lands selected such that increased fluid pressure in the stem opening causes the seal leg to flex inwardly so that the intermediate and upper sealing lands incrementally sealing against the stem, which results from the different pressure levels within the stem opening.

2. The metal seal according to claim 1 wherein the seal body has an inner diameter slightly greater then the diameter of the stem and wherein the seal body has a plurality of axially spaced apart lubricating grooves located on the inner diameter of the seal body.

3. The metal seal according to claim 1 wherein the stem opening has an upwardly facing shoulder, and wherein the seal further comprises:
   a support leg depending from the seal body concentric with and surrounding the seal leg;
   the support leg having a lower end which abuts the upwardly facing shoulder; and
   wherein the valve further comprises retaining means for retaining the seal with the support leg in abutment with the upwardly facing shoulder.

4. The metal seal according to claim 1 wherein the upper sealing land, intermediate sealing land, and lower sealing land are substantially cylindrical surfaces.

5. The metal seal according to claim 1 further comprising an elastomeric seal on an exterior diameter of the seal body in sealing engagement with the stem opening.

6. The metal seal according to claim 1 wherein the seal body has a generally cylindrical inner diameter having a flex recess located at a junction of the seal body and seal leg at the lower end of the inner diameter of the seal body to facilitate flexing of the seal leg.

7. A gate valve comprising in combination:
   a valve body;
   an axially movable stem extending through a stem opening in the valve body for moving a gate between open and closed positions;
   a metal seal located in the stem opening and having an annular seal body through which the stem extends;
   a flexible annular seal leg depending from the seal body for sealing against the stem, the seal leg having a tip at its lower end;
   an inner surface of the seal leg having a plurality of axially spaced apart grooves defining a lower sealing land at the tip, and at least one intermediate sealing land and an upper sealing land spaced above the lower sealing land;
   the lower sealing land having an undeflected inner diameter that is slightly less than the outer diameter of the stem so that the seal leg will flex outward as the stem inserts through the seal and seal against the stem;
   the intermediate sealing land having an undeflected inner diameter that is greater than the undeflected inner diameter of the lower sealing land;

the upper sealing land having an undeflected inner diameter that is greater than the undeflected inner diameter of the intermediate sealing land;

the undeflected inner diameters of the intermediate and upper sealing lands selected such that different increased fluid pressure levels in the stem opening cause the seal leg to flex inwardly so that the intermediate and upper sealing lands subsequently and sequentially coming into contact with the stem;

the seal body having an inner diameter slightly greater then the diameter of the stem and having a plurality of axially spaced apart lubricating grooves located on the inner diameter of the seal body;

the stem opening having an upwardly facing shoulder; and the seal body having a support leg depending from the seal body concentric with and surrounding the seal leg, the support leg having a lower end which abuts the upwardly facing shoulder.

8. The gate valve according to claim 7 further comprising a retaining means for retaining the support leg in abutment with the upwardly facing shoulder.

9. The gate valve according to claim 7 wherein the upper sealing land, intermediate sealing land, and lower sealing land are substantially cylindrical surfaces.

10. The gate valve according to claim 7 further comprising an elastomeric seal on an exterior diameter of the seal body in sealing engagement with the stem opening.

11. The gate valve according to claim 7 wherein the seal body has a generally cylindrical inner diameter having a flex recess located at a junction of the seal body and seal leg at the lower end of the inner diameter of the seal body to facilitate flexing of the seal leg.

* * * * *

UNITED STATES PATENT AND TRADEMARK OFFICE
CERTIFICATE OF CORRECTION

PATENT NO. : 5,375,812
DATED : December 27, 1994
INVENTOR(S) : Peter M. Kent

It is certified that error appears in the above-indentified patent and that said Letters Patent is hereby corrected as shown below:

Column 1, line 22, "non-rising-stem type in" should read --non-rising-stem type--.

Column 3, line 20, "angle 7e" should read --angle 78"--.

Signed and Sealed this

Thirtieth Day of May, 1995

*Attest:*

BRUCE LEHMAN

*Attesting Officer*    *Commissioner of Patents and Trademarks*